United States Patent
Sasaki et al.

(10) Patent No.: US 8,214,094 B2
(45) Date of Patent: Jul. 3, 2012

(54) HYBRID SYSTEM FOR MOTOR VEHICLE WITH INTERNAL COMBUSTION ENGINE AND MOTOR-GENERATOR

(75) Inventors: Shizuo Sasaki, San Antonio, TX (US); Jayant V. Sarlashkar, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 877 days.

(21) Appl. No.: 12/327,494

(22) Filed: Dec. 3, 2008

(65) Prior Publication Data

US 2010/0138085 A1   Jun. 3, 2010

(51) Int. Cl.
- B60L 9/00 (2006.01)
- B60W 10/00 (2006.01)
- B60W 10/04 (2006.01)
- F16H 59/00 (2006.01)
- H02P 1/00 (2006.01)

(52) U.S. Cl. ............... 701/22; 180/65.265; 180/65.285; 74/335; 318/139

(58) Field of Classification Search ............ 701/22, 701/55, 56, 115; 903/909–910, 914–919, 903/945–947; 180/65.235–65.29, 197; 477/3, 477/121, 143, 155; 475/5; 123/295; 318/139; 290/16, 45

See application file for complete search history.

(56) References Cited

U.S. PATENT DOCUMENTS

| | | | |
|---|---|---|---|
| 6,524,215 B1* | 2/2003 | Schmidt | 477/3 |
| 7,851,954 B2* | 12/2010 | Endo et al. | 310/68 D |
| 2004/0112158 A1* | 6/2004 | Norum et al. | 74/335 |
| 2005/0101432 A1* | 5/2005 | Pels et al. | 477/5 |
| 2006/0224282 A1* | 10/2006 | Seo et al. | 701/22 |
| 2006/0289208 A1* | 12/2006 | Katsuhiro et al. | 180/65.2 |
| 2008/0272717 A1* | 11/2008 | Gleason et al. | 318/139 |
| 2009/0014222 A1* | 1/2009 | Tatematsu et al. | 180/65.2 |

* cited by examiner

Primary Examiner — James Trammell
Assistant Examiner — Majdi Alsomiri
(74) Attorney, Agent, or Firm — Chowdhury & Georgakis, P.C.; Ann C Livingston, Attorney (57) ABSTRACT

A hybrid system for powering a vehicle and a method of controlling the hybrid system. The hybrid system has both an internal combustion engine and a motor/generator. The vehicle is controlled in response to the combination of states of five control parameters of the vehicle: polarity of the MG (positive or negative), relative rotor/stator speed, fueling of engine (on or off), clutch (on or off), and transmission shift position (drive, reverse, park). A control unit receives data from the vehicle representing these states, and determines an associated control mode. In at least one of the control modes, the engine both drives the vehicles and provides power to the generator.

13 Claims, 11 Drawing Sheets

| POLARITY | RELATIVE SPEED | FUELING | CLUTCH | AMT MODE | MODE |
|---|---|---|---|---|---|
| | 0 | OFF | OFF | | 0 |
| + | ROTOR>STATOR (MOTORING) | ON | ON | DRIVE | 1 |
| | | | | REVERSE | ~~2~~ |
| | | | OFF | | 3 |
| | | OFF | ON | DRIVE | 4 |
| | | | | REVERSE | ~~5~~ |
| | | | OFF | | ~~6~~ |
| | STATOR>ROTOR (GENERATING) | ON | ON | DRIVE | (7) |
| | | | | REVERSE | 8 |
| | | | OFF | PARKING | 9 |
| | | OFF | ON | DRIVE | 10 |
| | | | | REVERSE | 11 |
| | | | OFF | | 12 |
| − | ROTOR>STATOR (GENERATING) | ON | ON | DRIVE | (13) |
| | | | | REVERSE | ~~14~~ |
| | | | OFF | | 15 |
| | | OFF | ON | DRIVE | 16 |
| | | | | REVERSE | ~~17~~ |
| | | | OFF | | 18 |
| | STATOR>ROTOR (MOTORING) | ON | ON | DRIVE | 19 |
| | | | | REVERSE | 20 |
| | | | OFF | | 21 |
| | | OFF | ON | DRIVE | ~~22~~ |
| | | | | REVERSE | 23 |
| | | | OFF | PARKING | 24 |

*FIG. 3*

| VEHICLE SPEED (KM/H) | DRIVE SHAFT SPEED (RPM) | ROTOR SPEED (RPM) | GEAR 6 |||  GEAR 1 |||
|---|---|---|---|---|---|---|---|---|
| | | | ENGINE SPEED AT 6TH GEAR (RPM) | STATOR SPEED AT 6TH GEAR (RPM) | RELATIVE M/G SPEED AT 6TH GEAR (RPM) | ENGINE SPEED AT 1ST GEAR (RPM) | STATOR SPEED AT 1ST GEAR (RPM) | RELATIVE M/G SPEED AT 1ST GEAR (RPM) |
| 0 | 0 | 0 | 0 | 0 | 0 | 0 | 0 | 0 |
| 3 | 25 | 96 | 60 | 9 | 87 | 384 | 55 | 41 |
| 5 | 42 | 160 | 100 | 14 | 146 | 639 | 91 | 69 |
| 10 | 84 | 320 | 200 | 29 | 291 | 1279 | 183 | 137 |
| 15 | 126 | 480 | 300 | 43 | 437 | 1918 | 274 | 206 |
| 20 | 168 | 839 | 400 | 57 | 582 | 2558 | 365 | 274 |
| 30 | 252 | 959 | 599 | 86 | 873 | 3836 | 548 | 411 |
| 50 | 420 | 1599 | 999 | 143 | 1456 | 6394 | 913 | 685 |
| 75 | 630 | 2398 | 1499 | 214 | 2184 | | | |
| 100 | 840 | 3197 | 1998 | 285 | 2912 | | | |
| 125 | 1049 | 3996 | 2498 | 357 | 3639 | | | |
| 150 | 1259 | 4796 | 2997 | 428 | 4367 | | | |
| 175 | 1469 | 5595 | 3497 | 500 | 5095 | | | |
| 200 | 1679 | 6394 | 3996 | 571 | 5823 | | | |

*FIG. 4*

| VEHICLE SPEED (KM/H) | DRIVE SHAFT SPEED (RPM) | ROTOR SPEED (RPM) | GEAR 6 | | | GEAR 1 | | |
|---|---|---|---|---|---|---|---|---|
| | | | ENGINE SPEED AT 6TH GEAR (RPM) | STATOR SPEED AT 6TH GEAR (RPM) | RELATIVE M/G SPEED AT 6TH GEAR (RPM) | ENGINE SPEED AT 1ST GEAR (RPM) | STATOR SPEED AT 1ST GEAR (RPM) | RELATIVE M/G SPEED AT 1ST GEAR (RPM) |
| 0 | 0 | 0 | 0 | 0 | 0 | 0 | 0 | 0 |
| 3 | 25 | 60 | 60 | 18 | 42 | 420 | 123 | -63 |
| 5 | 42 | 100 | 100 | 29 | 71 | 699 | 206 | -106 |
| 10 | 84 | 200 | 200 | 59 | 141 | 1399 | 411 | -212 |
| 15 | 126 | 300 | 300 | 88 | 212 | 2098 | 617 | -317 |
| 20 | 168 | 400 | 400 | 118 | 282 | 2797 | 823 | -423 |
| 30 | 252 | 599 | 599 | 176 | 423 | 4196 | 1234 | -635 |
| 50 | 420 | 999 | 999 | 294 | 705 | | | |
| 75 | 630 | 1499 | 1499 | 441 | 1058 | | | |
| 100 | 840 | 1998 | 1998 | 588 | 1410 | | | |
| 125 | 1049 | 2498 | 2498 | 735 | 1763 | | | |
| 150 | 1259 | 2997 | 2997 | 882 | 2116 | | | |
| 175 | 1469 | 3497 | 3497 | 1028 | 2468 | | | |
| 200 | 1679 | 3996 | 3996 | 1175 | 2821 | | | |

HYBRID SYSTEM FOR MOTOR VEHICLE WITH INTERNAL COMBUSTION ENGINE AND MOTOR-GENERATOR

TECHNICAL FIELD OF THE INVENTION

This invention relates to hybrid drive systems for motor vehicles, and more particularly to a hybrid system having an internal combustion engine and a motor-generator.

BACKGROUND OF THE INVENTION

In today's terminology, a "hybrid vehicle" is a vehicle that uses two or more distinct power sources to propel the vehicle. Most of today's hybrid vehicles use an on-board rechargeable energy storage system and a fueled power source (internal combustion engine or fuel cell). The term "hybrid vehicle" most commonly refers to a hybrid-electric vehicle (HEV), which has both an electric motor/battery system and an internal combustion engine.

One type of modern mass-produced HEV prolongs the charge on the motor battery by capturing kinetic energy via regenerative braking. Other HEV's use the engine to generate electricity by spinning an electrical generator (often a motor-generator), which either recharges the battery or directly delivers power to a motor.

HEV's can be categorized as being either parallel or series systems. Parallel systems have both an internal combustion engine and an electric motor connected to a mechanical transmission. Most designs combine a large electrical generator and a motor into one unit, often located between the combustion engine and the transmission, replacing both the conventional starter motor and the alternator. The two sources of power (engine and motor) are mechanically coupled with a differential gear.

Series hybrid vehicles tend to be more similar in design to a battery electric vehicle than an internal combustion vehicle or parallel hybrid. In a series system, the combustion engine drives an electric generator instead of directly driving the wheels. The generator both charges a battery and powers an electric motor that moves the vehicle. When large amounts of power are required, the motor draws electricity from both the battery and the generator. Thus, a feature of a series hybrid is the lack of a mechanical link between the combustion engine and the wheels.

Combined hybrid systems have features of both series and parallel hybrids. They incorporate power-split devices allowing for power paths from the engine to the wheels that can be either mechanical or electrical. The main principle behind such a system is the decoupling of power supplied by the engine from power demanded by the driver.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a hybrid system, whose main elements are an internal combustion engine (reciprocating engine), a motor/generator (M/G), a clutch, and an automatic manual transmission (AMT). The system has a number of modes of operation, which are selected based on the following control parameters: the relative speed between the stator and rotor of the generator, whether engine fueling is on or off, whether the clutch is on or off, the polarity of the system's electrical circuit, and the shift position of the transmission.

A feature of the system is its ability to switch between parallel and series hybrid operation. Such switching is achieved during a particular combination of states of the control parameters. The system uses only a single clutch.

Figure 1:
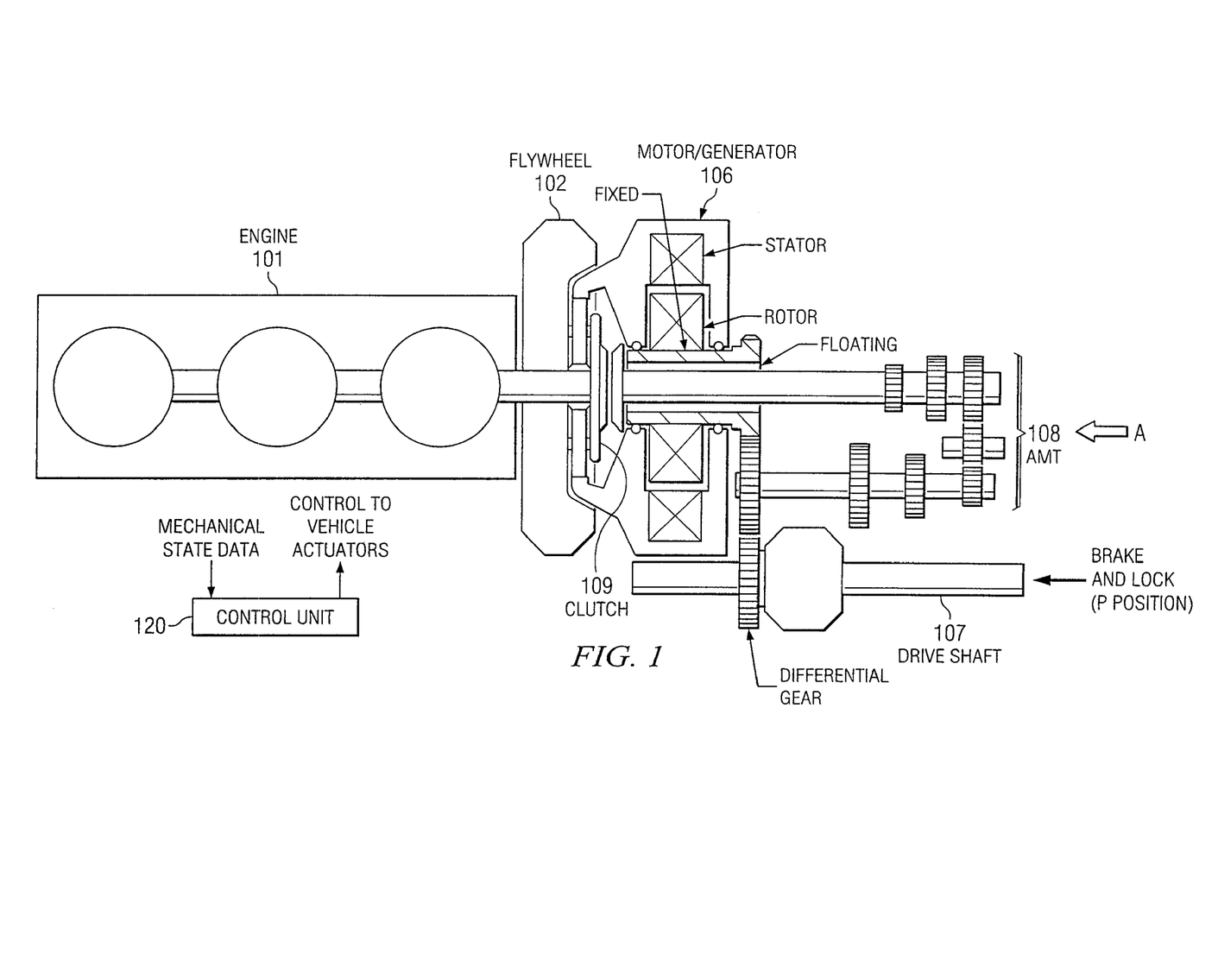
FIG. 1 illustrates the relevant mechanical elements of the hybrid vehicle.

FIG. 1 illustrates one embodiment of the hybrid system 100. Its typical application is in a motor vehicle, such as an automobile.

As explained below, system 100 is a "parallel/series" hybrid system. It has both an internal combustion engine 101 and motor-generator (MG) 106. The stator of motor-generator 106 is connected to engine 101, and its rotor is coupled to drive shaft 107. The motor-generator may be installed in the housing of clutch 109 for electrical shielding.

As used herein, the term "motor-generator" describes a single power transducer that can be used as either an electric motor or a generator. In other words, it is capable of either providing electrical power or providing mechanical power.

Engine 101 is equipped with a de-compression system, and for purposes of this description is referred to as a "decompression engine". Although it is desirable to maintain a high compression ratio for engines, one disadvantage of a high compression ratio is that starting the engine is difficult. The starter motor must be larger and more powerful as must be the drive between the starter motor and the engine. To eliminate this disadvantage, decompression methods permit the engine to operate at a high compression ratio but reduce the compression ratio during starting. These decompression methods take many forms. One method of reducing compression during starting is to open the exhaust valves for a brief time during the compression stroke. For purposes of this description, engine 101 may be equipped with any one of various decompression devices. As explained below, decompression is used to reduce friction and oscillation at Modes 4, 10, 11, 16, and 23.

Flywheel 102 is attached to the engine crank shaft 103. As in conventional engine systems, flywheel 102 uses inertia to smooth out engine pulses.

Figure 2:
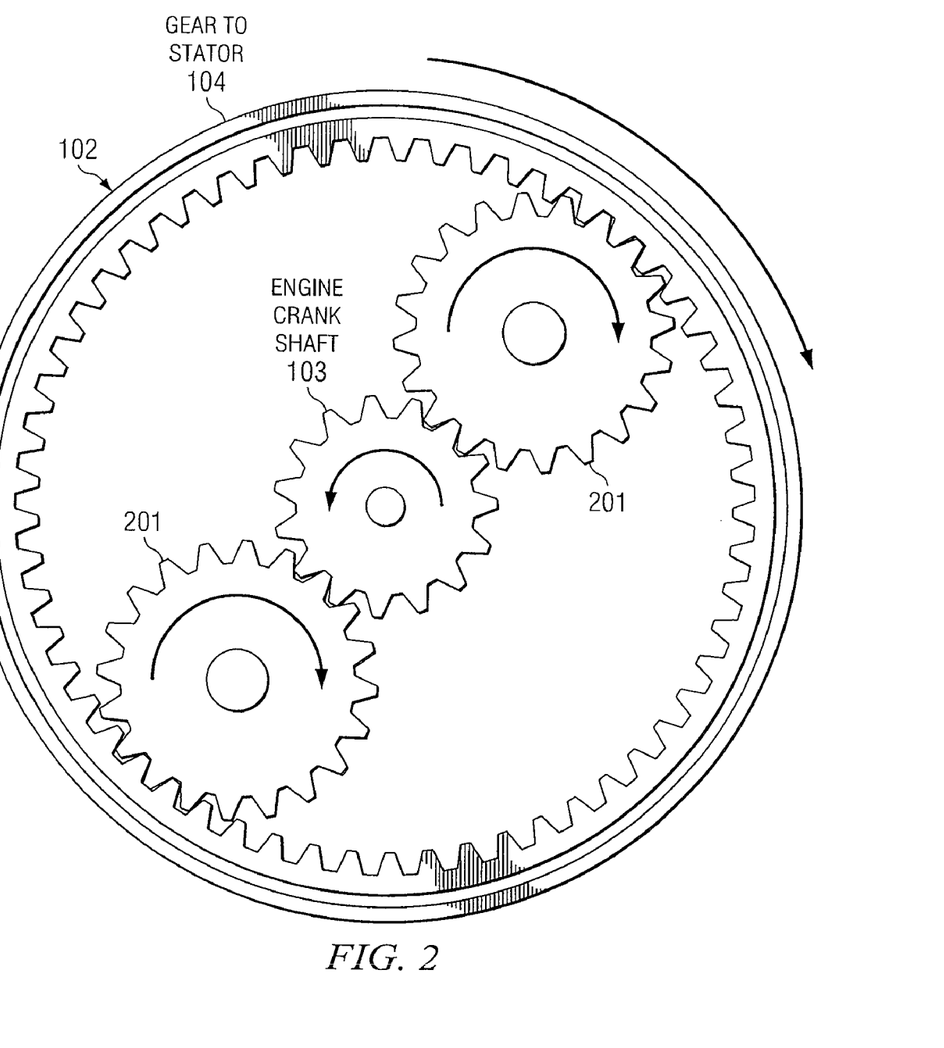
FIG. 2 is a cross sectional view of the engine, rotor, and stator gear relationship.

FIG. 2 is a sectional view of flywheel 102, viewed from the transmission from arrow A. Referring to both FIGS. 1 and 2, motor/generator 106 has a stator and rotor. The stator is bound with engine 101 through gear 104, and rotates clockwise. The rotor, coupled to drive shaft 107 through the transmission gearing, rotates clockwise when the vehicle moves forward and counter-clockwise when the vehicle is in reverse. As shown in FIG. 1, the rotor coupling to the transmission is "fixed", and the crankshaft coupling is "floating".

A gear system 104 is included in flywheel 102. Gear system 104 mechanically couples the crankshaft and the stator of MG 106. It functions to reduce the speed of the stator, and to change the rotation (from anticlockwise to clockwise).

The rotation speed of the stator is highly reduced from the engine speed with a high gear ratio. This facilitates the electrical connection between the stator, and the rest of the electrical system, such as the battery, inverter, etc. As illustrated in FIG. 2, the gear system inside fly wheel 102 comprises an outer ring gear 104 and two inner gears 201. The two inner gears 201 both turn in the same direction, and they interface between the inner surface of the outer ring gear 104 and the crankshaft which turns in the opposite direction.

Referring again to FIG. 1, the automatic manual transmission (AMT) 108 has a shift changing system with a number of forward shift positions (typically five or six) and a rear shift position. The shift condition is controlled automatically depending on vehicle speed, acceleration pedal position and its differential, and transmission shift position (for example, Park, Drive, Low and Reverse).

Clutch 109 operates in conjunction with the AMT to achieve gear shifts. The clutch is actuated by electronic equipment that synchronizes timing and torque to make gear shifts quick and smooth.

Control unit 120 may be implemented with digital processing and programming devices. Specifically, control unit 120 is programmed to control system 100 in accordance with the methods described herein.

More specifically, control unit 120 controls system 100 using the following five control parameters:

Polarity of the motor/generator (+ or −)
Relative rotor/stator (R/S) speed (rotor>stator or stator>rotor)
Fueling in engine (On or Off)
Clutch (On or Off)
Transmission shift position (P, D or R)

As explained below, each different combination of states of these control parameters is associated with a different "operating mode" of the vehicle. Control unit 120 receives input from various sensors, determines the state of each parameter, and the combination of parameter states to determine a mode of vehicle operation. Depending on the mode, control unit 120 controls vehicle operation by delivering appropriate control signals to various vehicle actuators.

Figure 3:
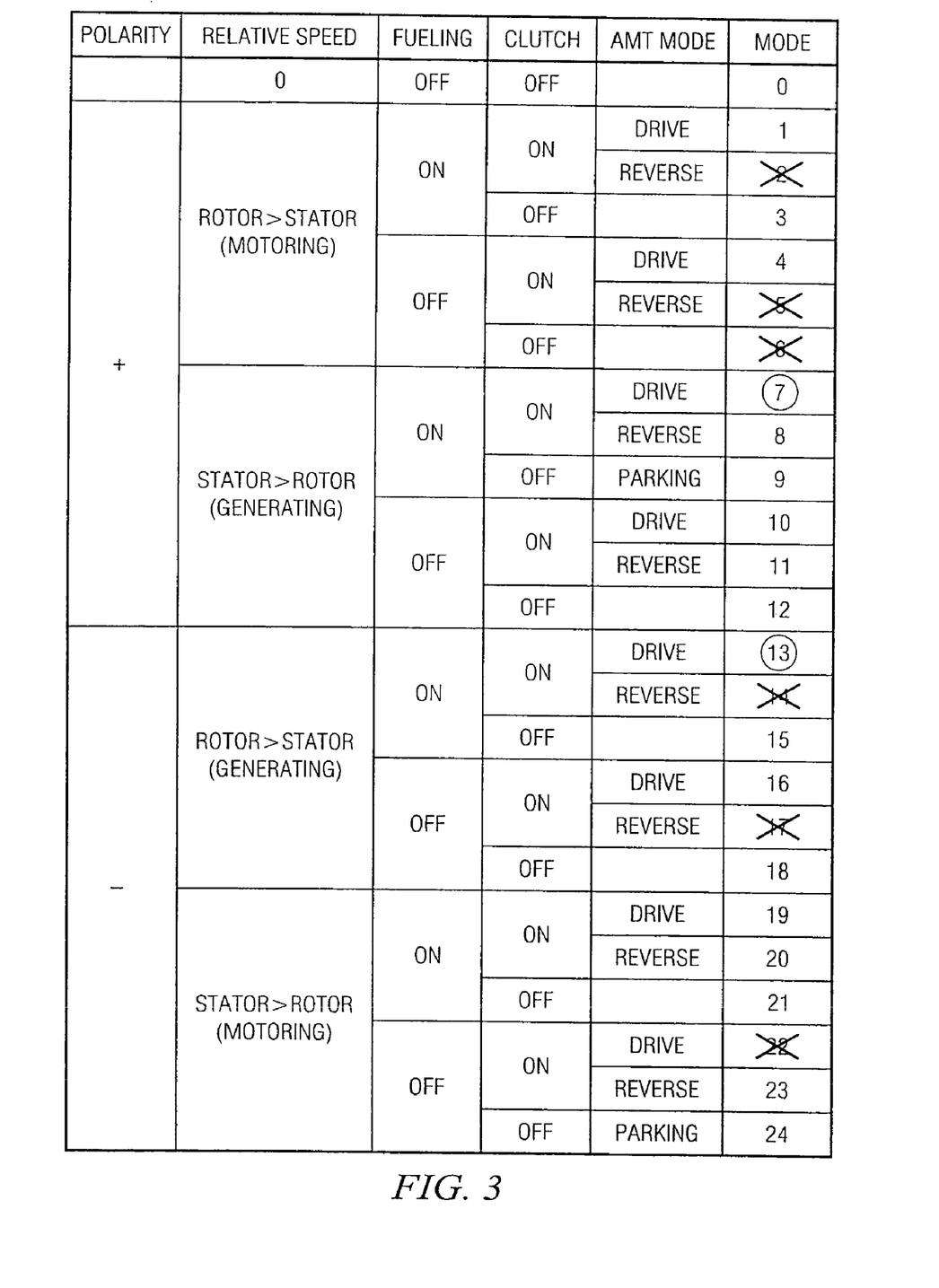
FIG. 3 illustrates the five mechanical "states" used to determine a vehicle mode of operation.

FIG. 3 is a table that illustrates how the above five control parameters determine the mode of operation of system 100. The various combinations of parameters result in 25 possible vehicle modes. Vehicle Mode 0 is a trivial "no operation" mode. Generally, Modes 0, 1, 3, 4, 7, 8, 9, 10, 11, 12, 13, 15, 16, 18, 19, 20, 21, 23, and 24 are used. In Modes 2, 5, 14, and 17 (not used), the rotor speed is greater than the stator speed and the shift position is reverse. In Mode 6 (not used), the engine cannot run. In Mode 22 (not used), the motor/generator would drive the vehicle with energy loss.

The various operational modes are described as follows, in terms of the vehicle's mechanical operation.

| Vehicle Mode | Vehicle Operation |
|---|---|
| 1 | Engine transfers torque to AMT; MG accelerates rotor speed and transfers torque to driveshaft. |
| 3 | Engine and motor both produce torque through MG and drive vehicle. |
| 4 | Vehicle starts and drives with motor power |

-continued

| Vehicle Mode | Vehicle Operation |
|---|---|
|  | (without fueling); Engine decompression activated. |
| 7 | Engine power is shared between driving and generating; Depending on gear ratio, this mode is used at slow speed. |
| 8 | Engine power is shared between driving and generating. |
| 9 | At P braking, engine generates energy. |
| 10 | MG driven by vehicle inertia and generates energy at a certain gear. |
| 11 | MG driven by vehicle inertia and generates energy as braking. |
| 12 | When vehicle goes back, generation/braking by MG control in limited area to avoid engine reversing. |
| 13 | Engine power shared between driving and energy to battery. |
| 15 | Engine drives vehicle and generates energy in MG with clutch off. |
| 16 | MG driven by vehicle inertia and generation/braking with engine decompression. |
| 18 | When vehicle goes forward, generation/braking by MG control in limited area to avoid engine reversing. |
| 19 | Engine transfers torque to AMT. MG protects rotor rotation; This mode only for triggering. |
| 21 | Engine and motor transfer torque to drive shaft through M/G, vehicle goes back. |
| 23 | Vehicle goes back by motor (without fueling); Engine decompressed. |
| 24 | P position or braking. |

From FIG. 3 and the above table, it should be noted that in the positive polarity state of the motor/generator (column 1), the relative rotor/stator state can be either motoring or generating (column 2). Likewise, in the negative polarity state of the motor/generator, the rotor/stator state can be either motoring or generating. The operation of the motor/generator as being either motoring or generating is referred to herein as its "MG quadrant".

During the MG generating mode, there are two modes (Mode 7 and Mode 13), in which engine energy is shared between driving and generating. Both of these modes are further characterized by "on" fueling, "on" clutch, and "drive" shift position. The engine also drives and generates in Mode 8 (reverse), and in Mode 15 (clutch off).

Figure 4:
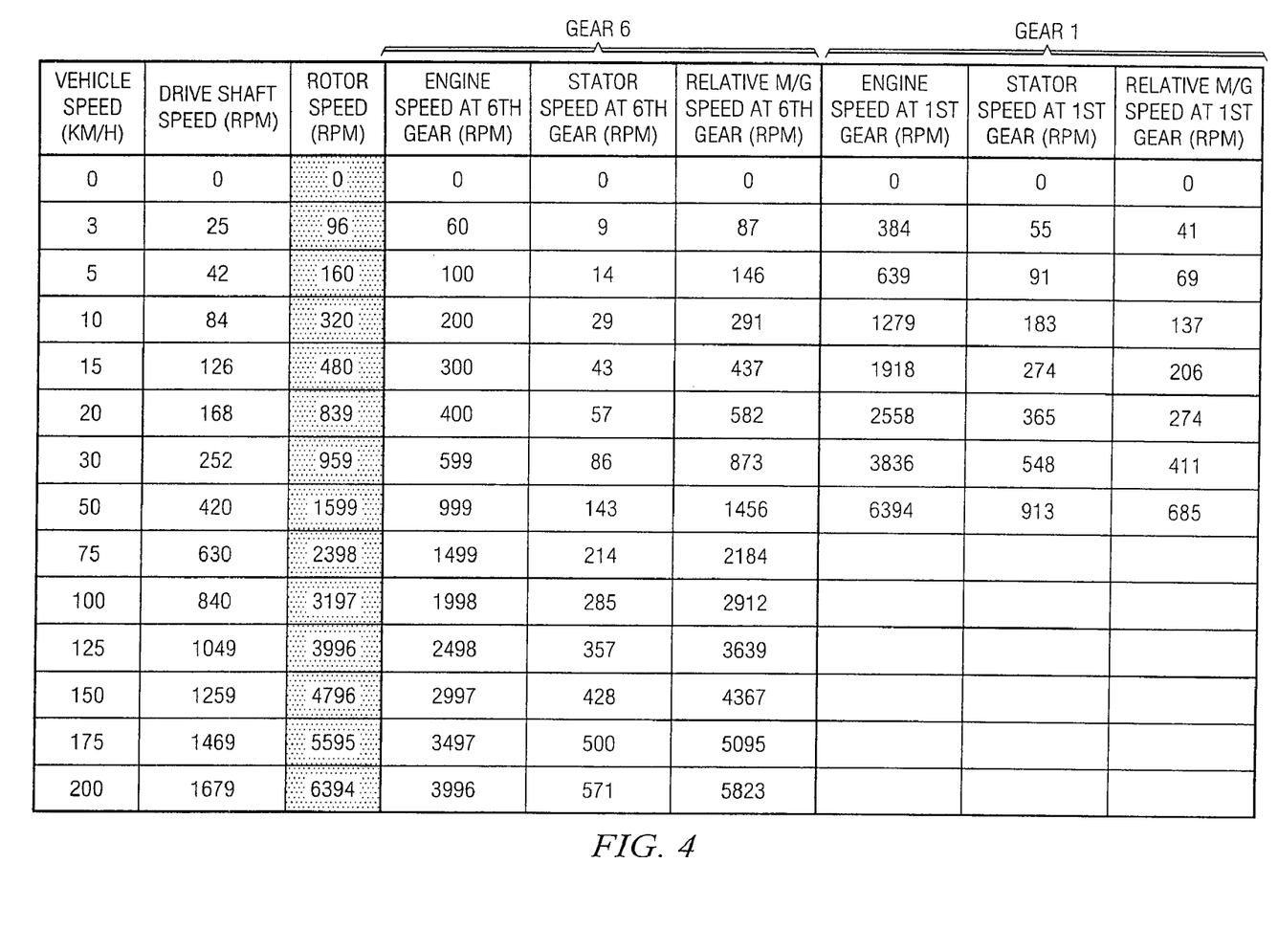
FIG. 4 illustrates an example of a vehicle geared to have the rotor speed greater than the stator speed in all gears.
Figure 5:
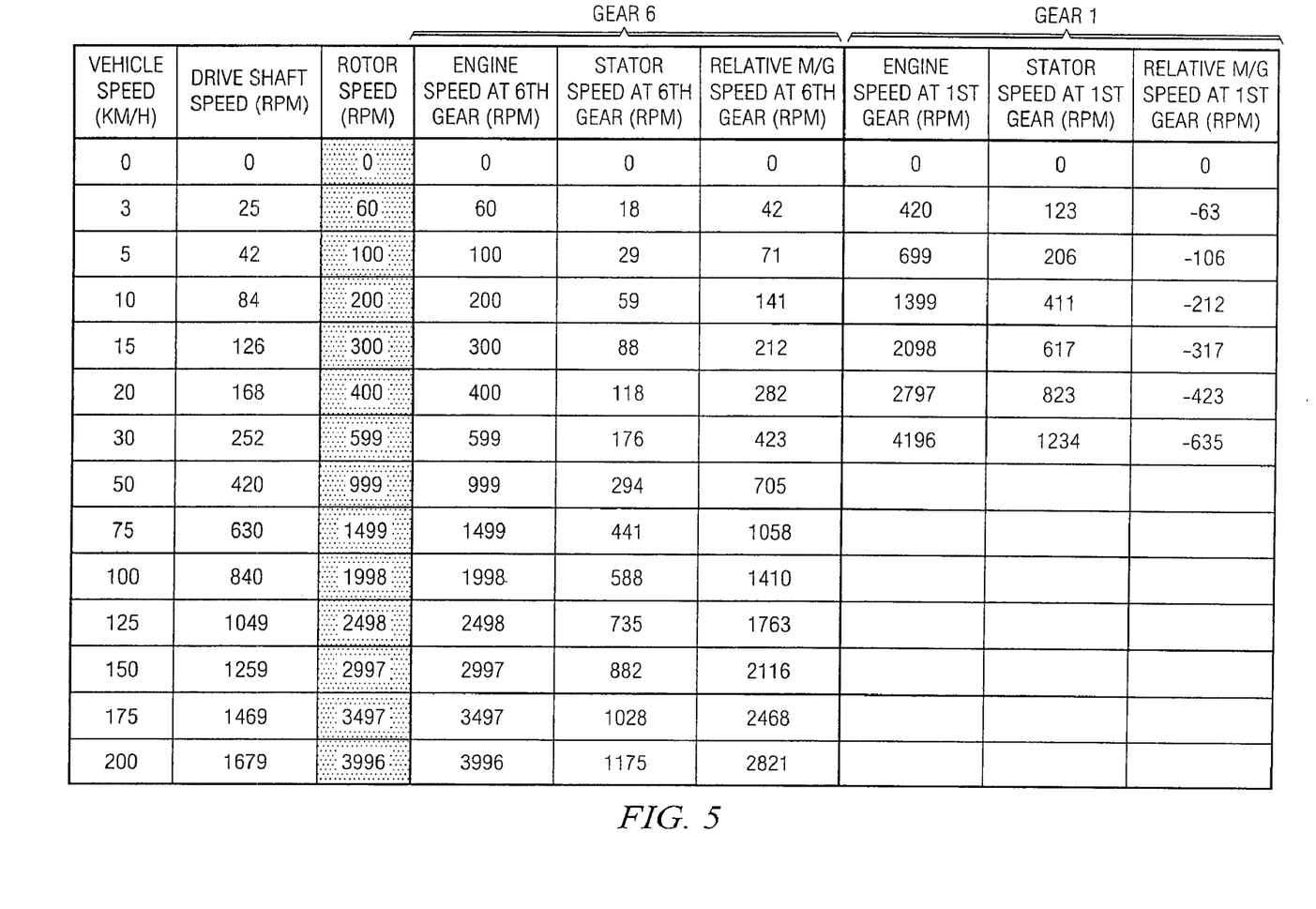
FIG. 5 illustrates an example of a vehicle geared to have the rotor speed greater than the stator speed in Gear 6, but the stator speed greater than the rotor speed in Gear 1.

FIGS. 4 and 5 illustrate how a range of engine and motor/generator speeds can be optimized by selection of various gear ratios (engine/stator, rotor/differential, AMT, differential, etc.).

In FIG. 4, the rotor speed is greater than the stator speed in all gears (Gears 1-6). In this case, the gear ratio between the engine and the stator is high.

In FIG. 5, the rotor speed is greater than the stator speed in high gear (Gear 6). However, in low gear (Gear 1), where the gear ratio between the engine and the stator is low, the stator speed is greater than the rotor speed.

FIGS. 6-11 illustrate various examples of engine operation. Each figure illustrates the vehicle speed, rotor/stator motion, battery charging state, and polarity as a function of time. The sequence of modes is shown at the top of each figure, with mode switching between modes.

As illustrated, control unit 120 selects an operating mode, depending on vehicle operation condition and the driver's desire, such as vehicle speed, acceleration pedal position, battery charge, and the shift position selected by driver. In some modes, engine decompression, intake control, or exhaust valve control are used to reduce engine pumping loss.

Figure 6:
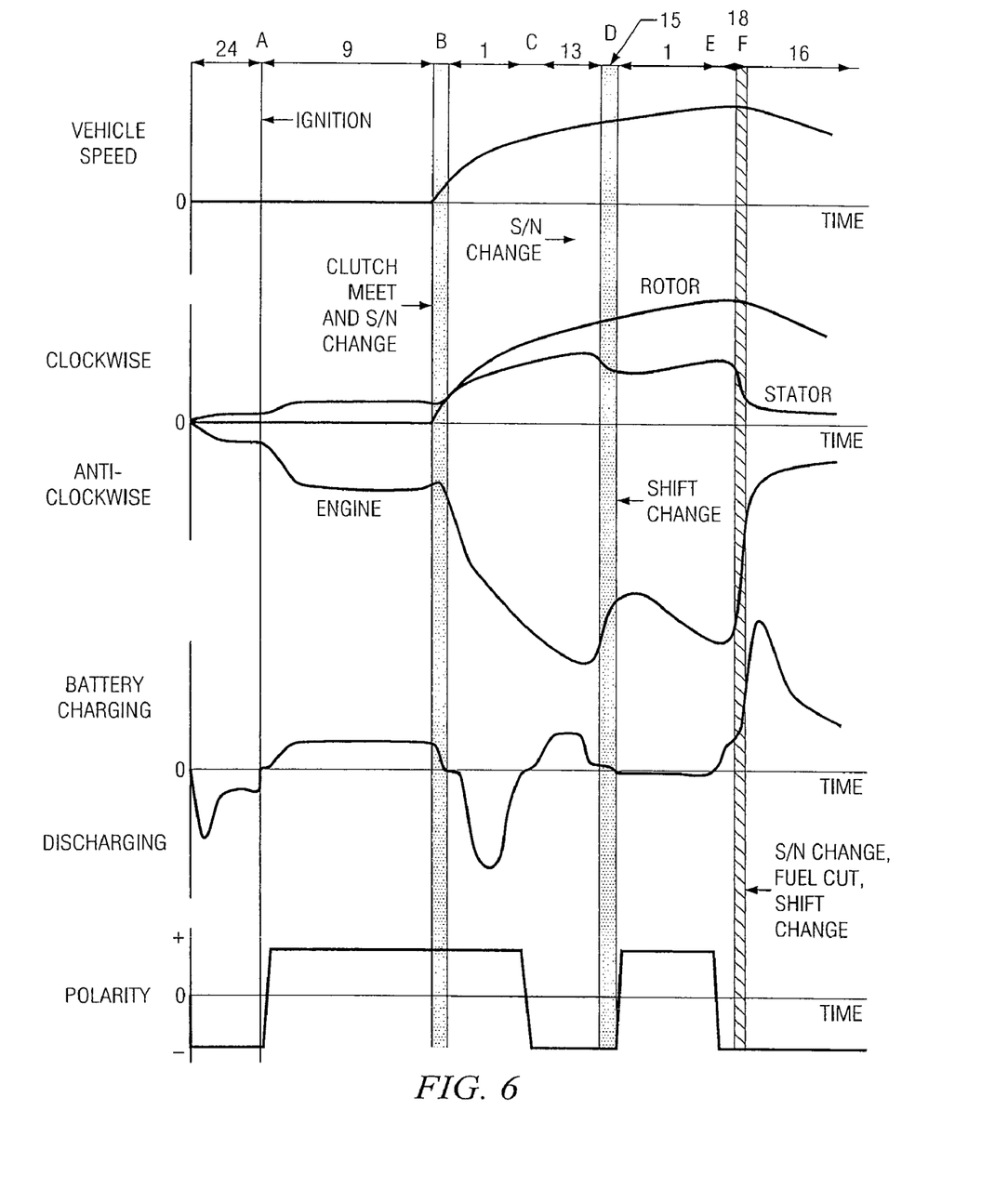
FIGS. 6-11 illustrate various examples of vehicle operation, as determined by the driver and the mechanical state of the vehicle.

FIG. 6 illustrates a key on, engine start, idle, strong acceleration, slow down, deceleration sequence of events. In this scenario, the battery charge is insufficient for starting.

The start is a combustion start (Mode 24 to Mode 9). Fuel is injected, which causes the engine speed to increase. The motor/generator mode is changed from motoring to generating by changing field polarity.

Mode 9 to Mode 1 is from clutch engagement to vehicle start. At the point of clutch engagement, charging of energy storage is decreased and fuel is increased to compensate for clutch friction. The relative speed between the stator and the rotor changes, but the real polarity is not changed. The motor/generator operates in parallel with the engine.

Mode 1 to Mode 13 is from discharging to charging. The field polarity is changed so that the motor/generator generates to adjust torque in applicable area. Switching hysteresis is used to reduce chattering. This is aided by the wide area of low fuel consumption of a diesel engine.

The transition from Mode 13 to Mode 15 to Mode 1 is associated with shift changing. The clutch is disengaged and fuel is increased. The amount of battery transaction (charge/discharge) is small. Engine torque is transferred to the drive shaft through the motor/generator (not the gear box). The transmission shift position is changed and clutch is engaged. The vehicle torque is controlled by engine fuel and motor/generator current. Then, the field polarity is changed if needed (depending on the battery state of charge).

Mode 1 to Mode 18 is associated with generation of energy at deceleration. With the driver pedal off, the engine is throttled, and fuel is cut. The field polarity is changed and the clutch is disengaged.

Mode 18 to Mode 16 is associated with braking by the motor/generator. Based on the position of the brake pedal, the motor/generator is operated as a brake.

Figure 7:
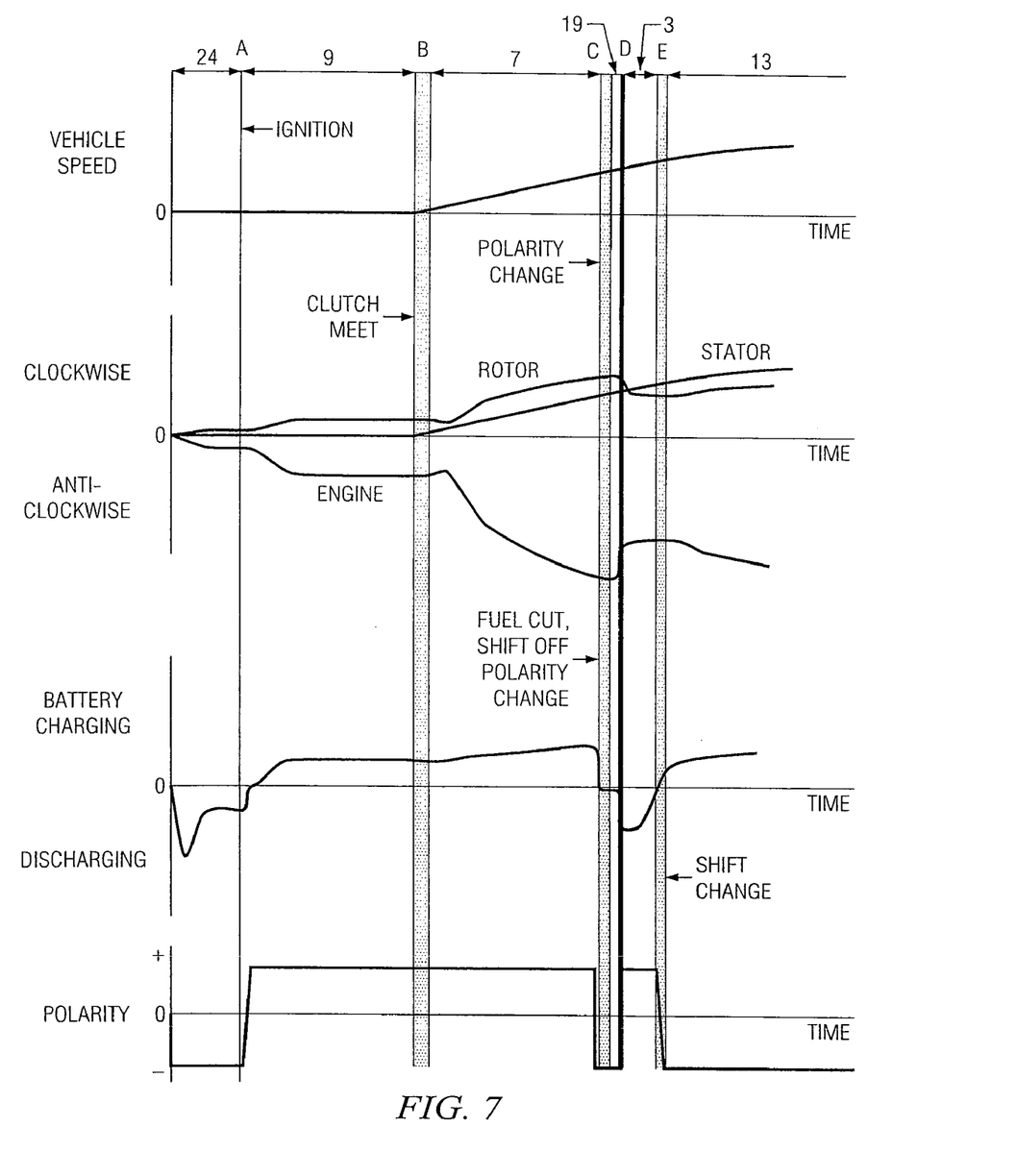

FIG. 7 illustrates a key on, engine start, idle, and slow cruising sequence.

Mode 1 to Mode 9 is a combustion start. (Battery energy is not enough.) Fuel is injected, which causes the engine speed to increase. The motor/generator mode is changed from motoring to generating by changing field polarity.

Mode 9 to Mode 7 is associated with clutch engagement and vehicle start. At the point of clutch engagement, charging of energy storage is decreased and fuel is increased, which compensates for clutch friction. The relative speed between the stator and rotor changes but the field polarity is not changed. The motor/generator operates in parallel with the engine.

Mode 7 to Mode 19 is associated with triggering to change force. Field polarity is changed while keeping the clutch engaged. The motor/generator mode changes from generating to motoring.

Mode 19 to Mode 3 is associated with shift off. The fuel to the engine is cut. The clutch is disengaged. The field polarity changes.

Mode 3 to Mode 13 is associated with shift on. The clutch is engaged while in second gear. The motor/generator mode changes from motoring (discharge) to generating (charge), that is, the field polarity changes.

Figure 8:
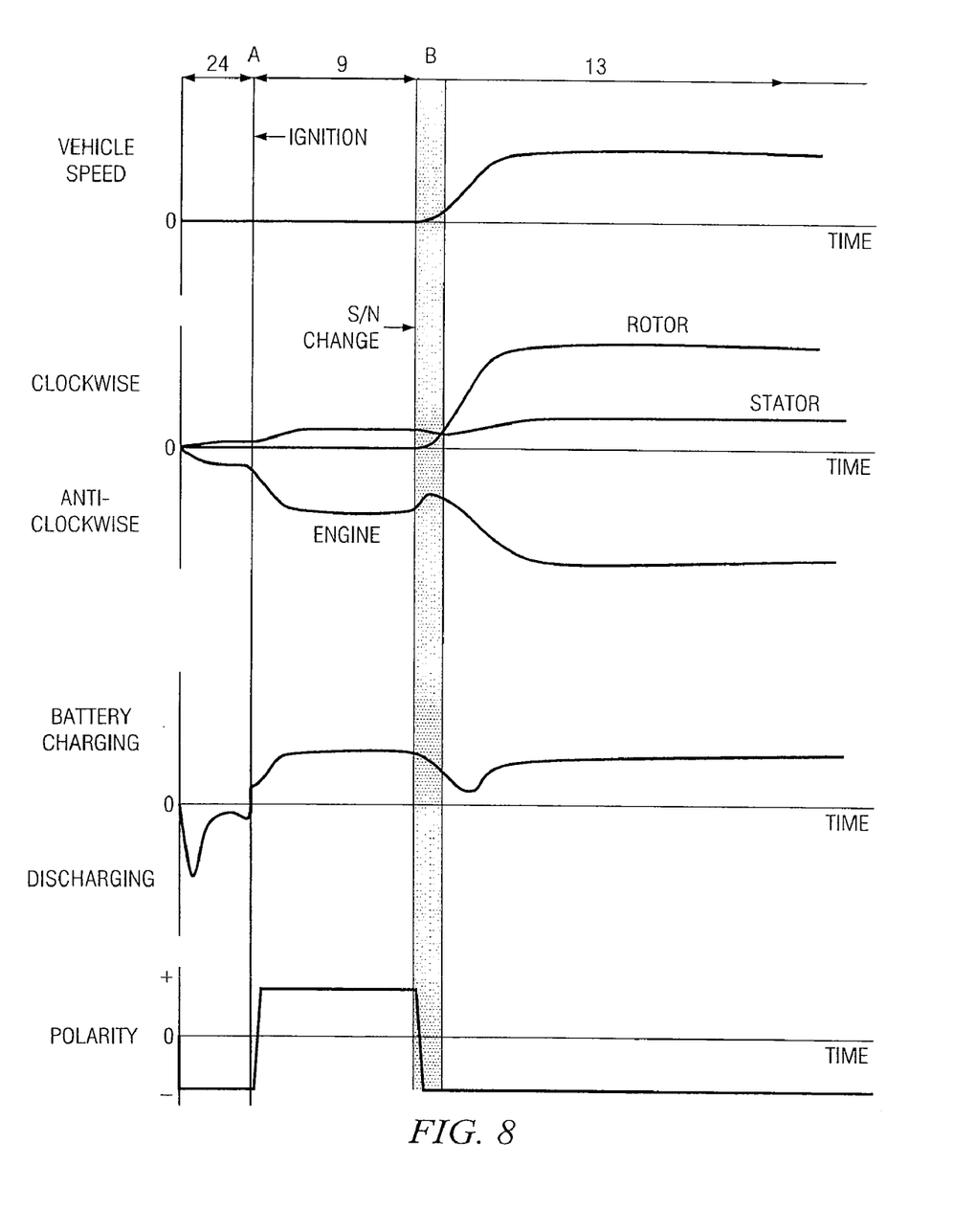

FIG. 8 illustrates a key on, engine start, idle, and slow acceleration sequence.

Mode 24 to Mode 9 is a combustion start. (Battery energy is not enough.) Fuel is injected, which causes the engine speed to increase. The motor/generator mode is changed from motoring to generating by changing field polarity.

Mode 9 to Mode 13 is associated with slow-speed driving. The field polarity is changed to drive vehicle through motor/generator. The vehicle brake is off (disengaged). The field polarity is changed while simultaneously controlling the fuel injection and charging of energy storage (battery).

Figure 9:
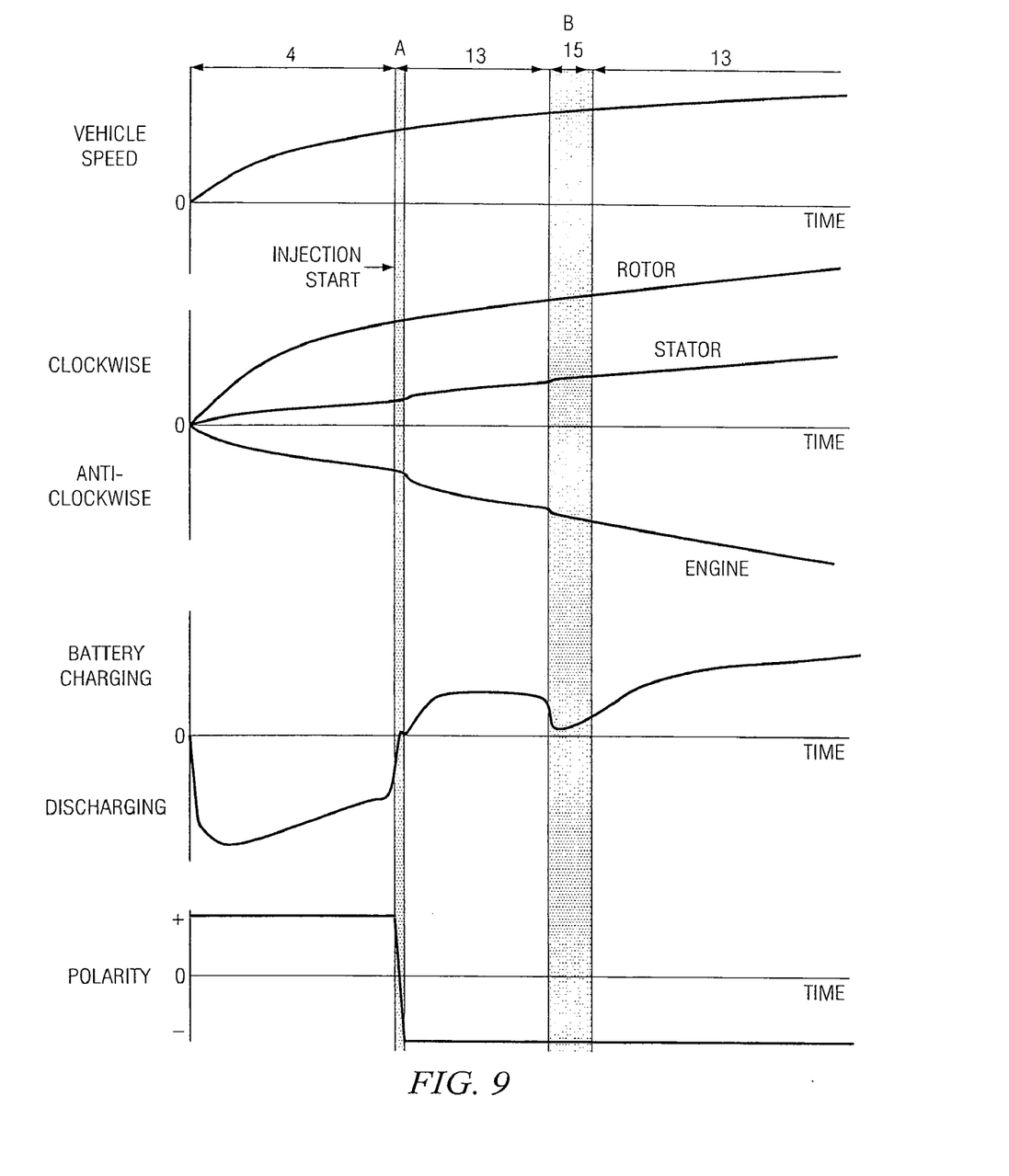

FIG. 9 illustrates a vehicle start without engine. This occurs when there is sufficient battery energy to start.

Mode 4 to Mode 13 is the engine start. The vehicle is driven by the motor/generator. Once the fuel is injected, the motor/generator mode is changed from motoring to generating by changing field polarity.

Mode 13 to Mode 15 to Mode 13 is associated with shift changing. The clutch is disengaged and the fuel is increased. Battery charging is decreased. Engine and motor both drive the vehicle. The transmission shift position is changed and clutch is engaged. The vehicle torque is controlled by engine fuel and motor/generator current.

Figure 10:
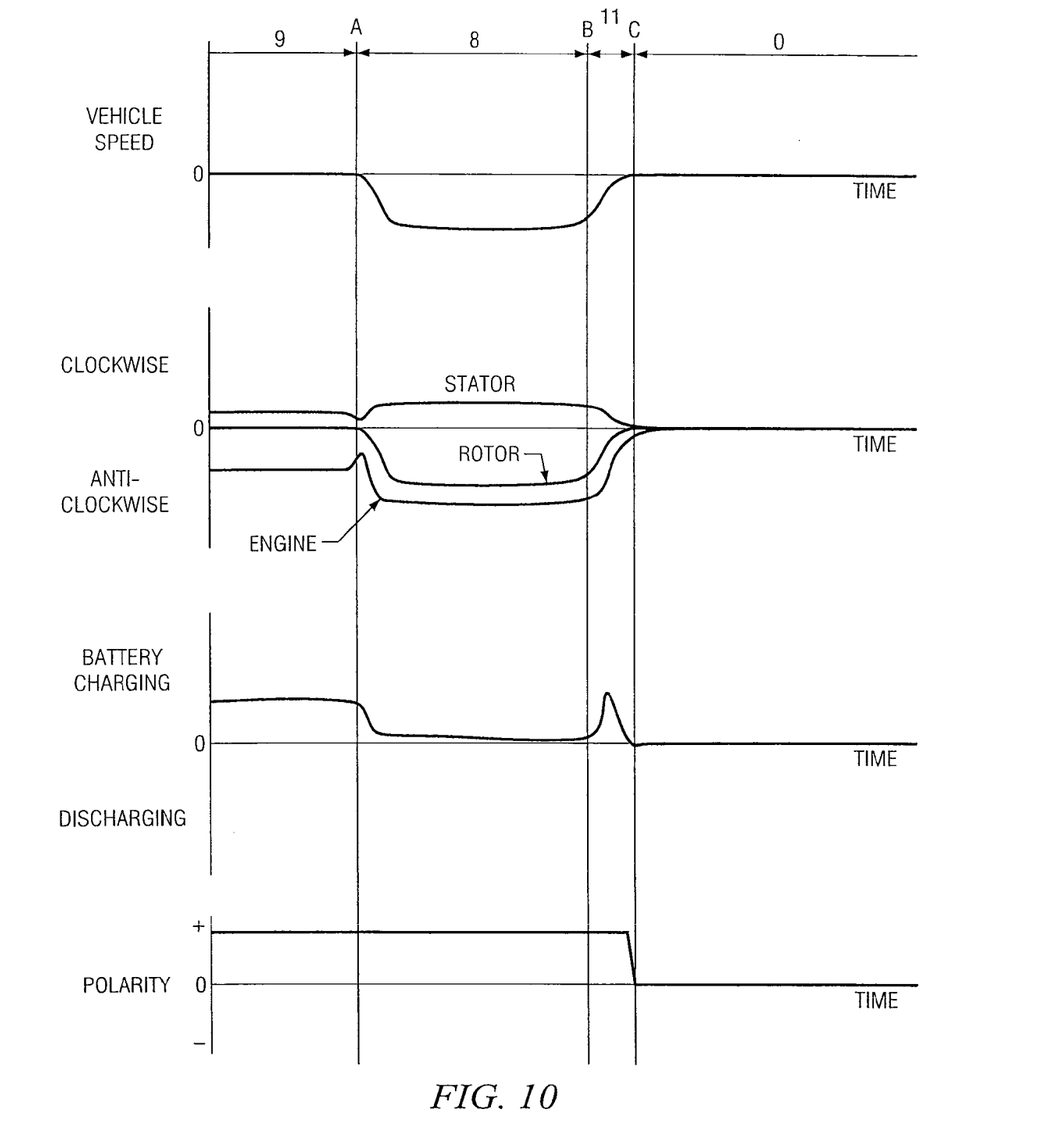

FIG. 10 illustrates a stop, reverse, stop sequence, with engine power.

Mode 9 to Mode 8 is associated with vehicle reverse start. The clutch is engaged. Charging is decreased and fuel is increased to compensate the clutch friction.

Mode 8 to Mode 11 is associated with braking. The engine fuel is cut.

Mode 11 to Mode 0 is associated with stopping. Fuel cut, and the motor torque is reduced to zero.

Figure 11:
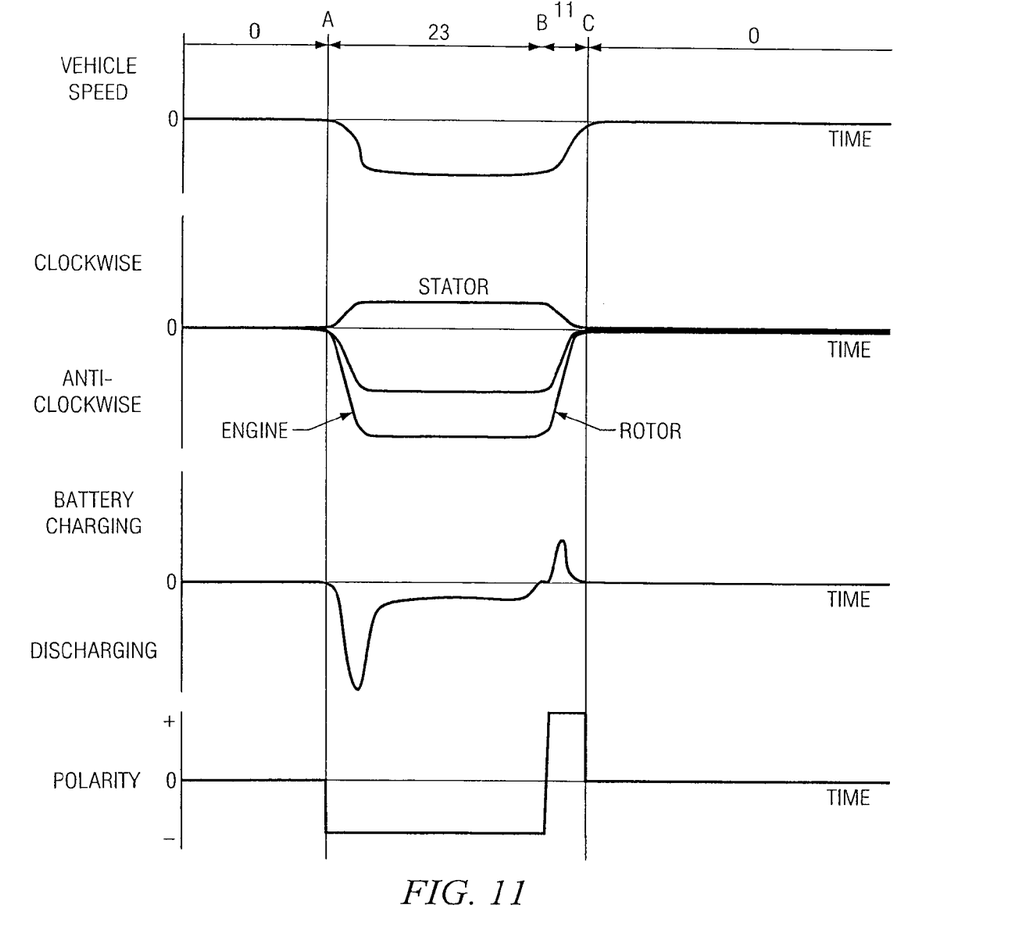

FIG. 11 illustrates a stop, reverse, stop sequence without engine power.

Mode 0 to Mode 23 is associated with vehicle reverse start. The clutch is engaged while in reverse gear. The motor/generator torque is controlled as needed with proper adjustment of field polarity.

Mode 23 to Mode 11 is associated with generating and braking. The field polarity is changed as needed.

Mode 11 to Mode 0 is associated with vehicle stopping. The motor torque is reduced to zero.

Figure 12:
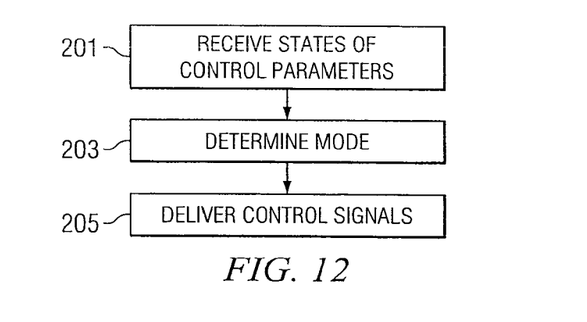
FIG. 12 is a flowchart of the method performed by the control unit.

FIG. 12 is a flowchart that summarizes the method performed by the control unit, in accordance with the above description. In Step 201, the control unit receives data representing the states of the various control parameters. In Step 203, the control unit selects the associated mode. In Step 205, the control unit delivers appropriate control signals, as defined by the selected mode.

What is claimed is:

1. A computer-implemented method of operating a hybrid system for a motor vehicle, the vehicle having at least a motor/generator (MG), an internal combustion engine, a crankshaft, and a transmission, the MG having a rotor and stator, comprising:
   coupling the stator of the MG to the engine crankshaft via a gear system;
   coupling the rotor of the MG to the engine crankshaft via a floating coupling and to the transmission via a fixed coupling;
   wherein the stator and the rotor have relative rotational speeds, such that the stator speed may exceed the rotor speed and vice versa;
   defining at least five control parameters of the vehicle as the following: polarity of the MG (positive or negative), relative rotor/stator speed, fueling of engine (on or off), the on or off position of a single clutch, and transmission shift position (drive, reverse, park);
   defining a number of operational modes, each mode associated with a different combination of states of the control parameters;

adjusting the gearing of the rotor and stator so that certain operational modes cause the MG to both drive the vehicle and generate electrical energy;

using an on-board control unit to receive data representing the state of each control parameter and to generate control signals to control the vehicle based on the associated operational mode.

2. The method of claim 1, wherein the adjusting step is performed so that the rotor speed is greater than the stator speed in the highest gear of the transmission, and the stator speed is greater than the rotor speed in the lowest gear of the transmission.

3. The method of claim 1, wherein at least one of the modes is a mode in which both the engine and the motor of the motor/generator produce torque and drive the vehicle.

4. The method of claim 1, wherein at least one of the modes is a mode in which the vehicle starts and drives with only power from the motor.

5. The method of claim 4, wherein the engine is a decompression engine and decompression is activated.

6. The method of claim 1, wherein the engine is a decompression engine and at least one of the modes is a mode in which the motor/generator is driven by vehicle inertia and decompression is activated.

7. The method of claim 1, wherein the modes that cause the engine to both drive the vehicle and generate electrical energy are the result of control parameter states in which fueling is on, clutch is on, and shift is in drive position.

8. The method of claim 1, wherein at least one of the modes is a mode in which the engine provides energy to the motor/generator during the control parameter state of park.

9. The method of claim 1, wherein at least one of the modes is a parallel mode in which both the engine and the motor/generator drive the vehicle, and at least one of the modes is a series mode in which the engine generates electrical power for the motor/generator.

10. A hybrid system for powering a vehicle driveshaft, the vehicle further having a transmission for providing at least park, reverse, and drive shift positions, and having a clutch for performing transmission shifts, the hybrid system comprising:

an internal combustion engine having a crankshaft; a motor/generator (MG) having a rotor and a stator;

a gear system for mechanically coupling the gears of the engine crankshaft and the stator;

wherein the rotor is mechanically coupled to the driveshaft through the transmission;

wherein the gearing of the rotor and stator is configured so that certain operational modes cause the MG to both drive the vehicle and generate electrical energy;

wherein the stator and the rotor have relative rotational speeds, such that in at least one operational mode the stator speed exceeds the rotor speed and in at least one operational mode the rotor speed exceeds the stator speed;

a control unit having memory and processing devices programmed to perform the following tasks: to receive mechanical state data from the vehicle representing the states of the following five control parameters of the vehicle: polarity of the MG (positive or negative), relative rotor/stator speed, fueling of engine (on or off), the on or off position of a single clutch, and transmission shift position (drive, reverse, park); to store data defining a number of operational modes, each mode associated with a different combination of states of the control parameters; to select a mode in response to the mechanical state data; to generate control signals to control the vehicle based on the associated operational mode; wherein at least one of the modes is a mode in which the engine both drives the vehicle and generates electrical energy.

11. A hybrid system for powering a vehicle driveshaft, the vehicle further having a transmission for providing at least park, reverse, and drive shift positions, and having a clutch for performing transmission shifts, the hybrid system comprising:

an internal combustion engine having a crankshaft;

a motor/generator having a rotor and a stator;

a gear system for mechanically coupling the crankshaft and the stator;

wherein the rotor is coupled to the driveshaft via the transmission and can rotate either clockwise or counterclockwise depending on the drive shift position;

wherein the stator and the rotor have relative rotational speeds, such that in at least one operational mode the stator speed exceeds the rotor speed and in at least one operational mode the rotor speed exceeds the stator speed; and wherein the gear system is further operable to reduce the engine rotation speed to a stator rotation speed.

12. The system of claim 11, wherein the gear system comprises an outer ring gear and two inner gears, such that the two inner gears interface between the inner surface of the outer ring gear.

13. The system of claim 11, wherein the gear system is housed within a flywheel between the engine and the motor/generator.

* * * * *